May 29, 1956  H. A. SCHOFIELD  2,747,781
PORTABLE CLOTHES HANGER FOR MOTOR VEHICLES
Filed May 2, 1955  2 Sheets-Sheet 1
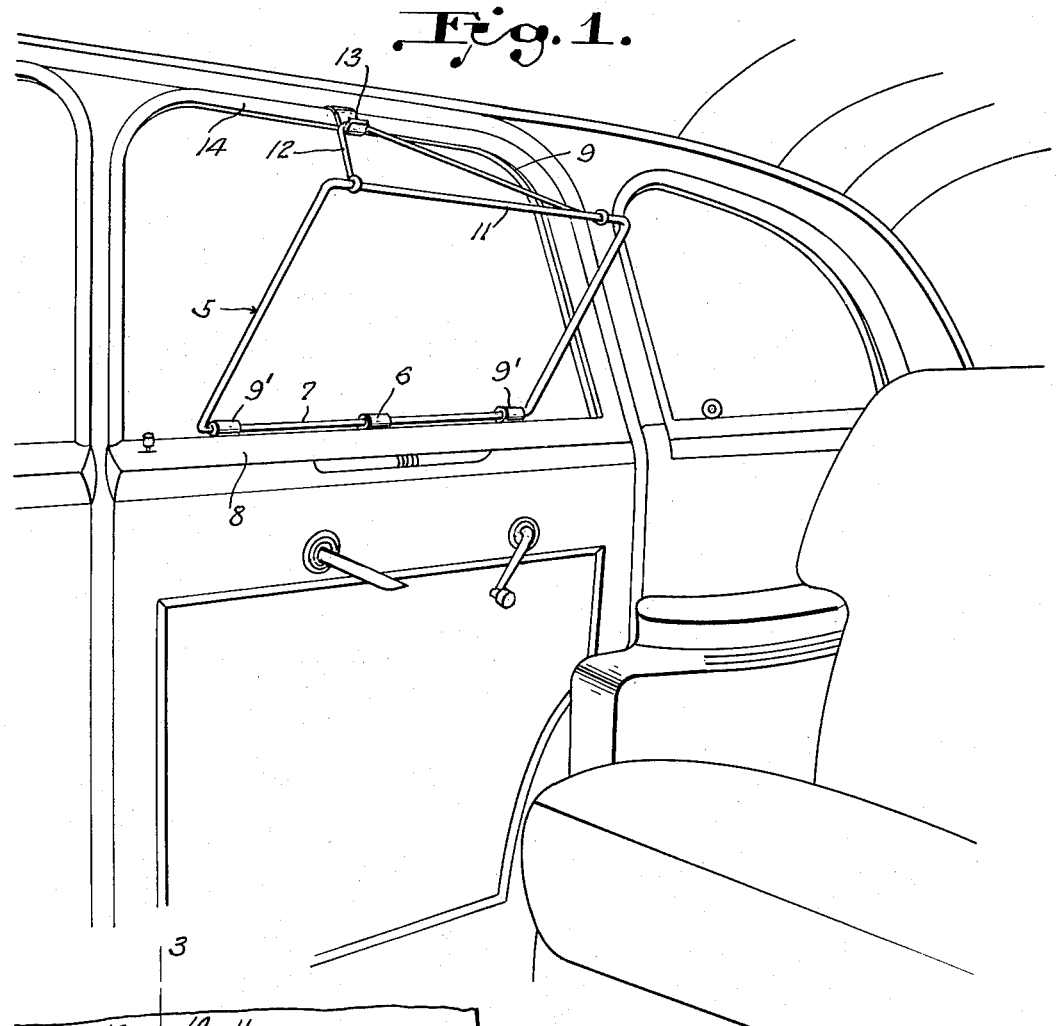
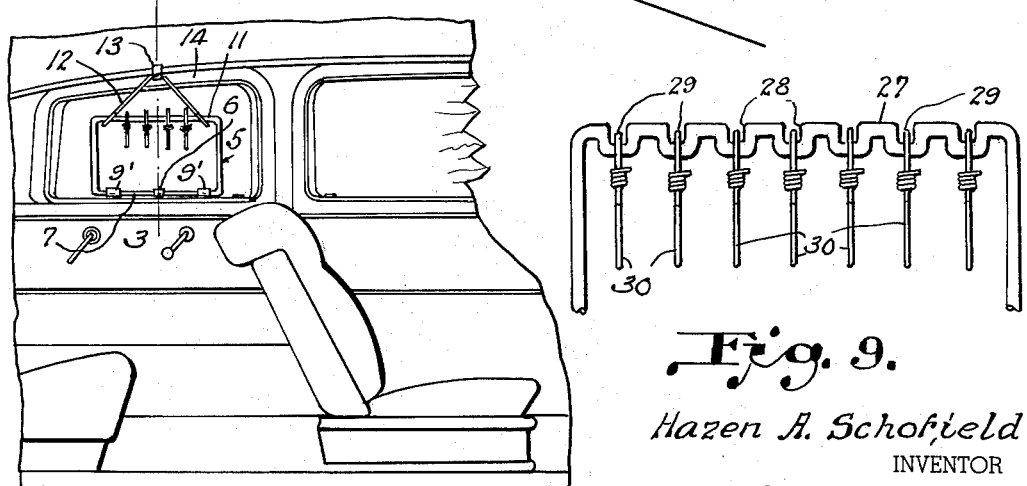
Hazen A. Schofield
INVENTOR
BY C. A. Snow & Co.
ATTORNEYS.

May 29, 1956  H. A. SCHOFIELD  2,747,781
PORTABLE CLOTHES HANGER FOR MOTOR VEHICLES
Filed May 2, 1955  2 Sheets-Sheet 2
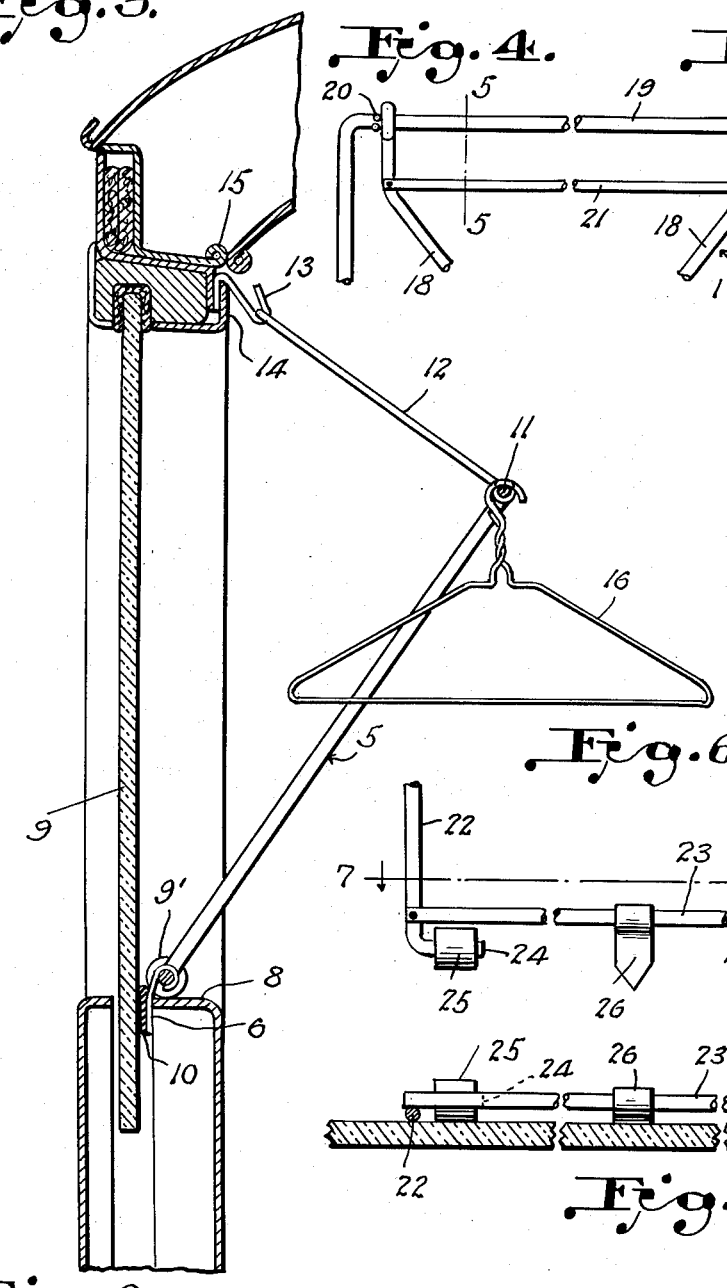
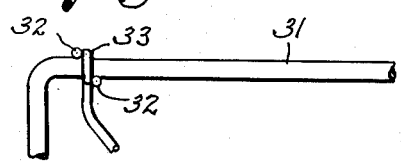
Hazen A. Schofield
INVENTOR
BY *C. A. Snow & Co.*
ATTORNEYS.

United States Patent Office 2,747,781
Patented May 29, 1956

2,747,781

PORTABLE CLOTHES HANGER FOR MOTOR VEHICLES

Hazen A. Schofield, Dallas, Tex.

Application May 2, 1955, Serial No. 505,109

2 Claims. (Cl. 224—42.45)

This invention relates to a portable rack designed for use in motor vehicles, the primary object of the invention being to provide a rack which may be securely but removably supported within a window opening of a motor vehicle, and constructed in such a way as to support a plurality of garments hung on conventional garment hangers.

An important object of the invention is to provide a rack having means for supporting a plurality of garments in prearranged spaced relation with respect to each other, so that the garments will not become wrinkled while hanging on their racks, or hangers.

Still another object of the invention is to provide a rack which may be folded into a small and compact article to facilitate the carrying of the same in the trunk compartment of a motor vehicle, the rack being readily unfolded and positioned for use.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a perspective view of the interior of a motor vehicle, illustrating a portable rack constructed in accordance with the invention as positioned for hanging garments thereon.

Figure 2 is an elevational view of the rack.

Figure 3 is an enlarged sectional view taken on line 3—3 of Figure 2.

Figure 4 is a fragmental enlarged elevational view illustrating a modified form of rack.

Figure 5 is a sectional view taken on line 5—5 of Figure 4.

Figure 6 is an enlarged fragmental elevational view illustrating that portion of the rack which rests on the sill of the window.

Figure 7 is a sectional view taken on line 7—7 of Figure 6.

Figure 8 is a fragmental elevational view illustrating one manner of connecting the triangular brace section to the main hanger.

Figure 9 is a fragmental elevational view of the hanger, illustrating means for spacing the individual garment hangers thereon.

Referring to the drawings in detail, the portable hanger forming the subject matter of the present invention comprises a main rectangular hanger frame indicated generally by the reference character 5, the hanger frame 5 being of a size slightly less than the window opening in which it is positioned.

The reference character 6 indicates a metal clip which is secured around a bar 7 of the hanger frame, and disposed at a point intermediate the ends thereof. This clip is substantially long as indicated more clearly by Figure 6 of the drawing, and is designed to extend between the window sill 8 of the motor vehicle window, and the window 9, to secure the hanger frame within the window opening. A cushioning member 10 is disposed between the clip 6 and window, so that the clip will not damage or mar the window against which it rubs, as the window is being raised or lowered.

The bar 7 also provides a support for rollers 9' that are disposed adjacent to the ends thereof and which rest on the window sill with which the device is used.

The main rectangular hanger frame includes an upper rod 11 to which the V-shaped hanger arm 12 is connected, the hanger arm 12 being designed to fit over the hook 13 which has one of its ends disposed between the flange 14 and flange 15 of the window frame, as better shown by Figure 3 of the drawing. Thus, it will be seen that due to this construction, the rectangular hanger frame is supported in an inclined position, so that the garment hangers indicated by the reference character 16 may be hung thereon in supporting a number of garments in such a way that they will not become wrinkled or damaged.

As shown by Figure 4 of the drawings, the main frame is indicated by the reference character 17, and a triangular hanger arm 18 is secured to the bar 19, there being provided lugs 20 punched from the bar 19 and disposed adjacent to the outer surfaces of the hanger arm 18 to restrict movement of the hanger arm 18 longitudinally of said bar 19. A brace bar 21 connects the arms of the hanger arm 18 and holds the hanger arm in its proper position under the weight of a number of garments held on the hanger.

As shown by Figures 6 and 7 of the drawings, the main rectangular hanger frame which includes rods 22, is braced by means of the bar 23 that connects with the rods 22. The rods 22 have inwardly extended ends 24 on which rollers 25 are mounted, the rollers resting against the sill of the window frame in which the hanger is mounted. In this form of the invention, a clip 26 is provided intermediate the ends of the bar 23 for positioning between the window sill and window with which the device is used.

The frame as shown by Figure 9 of the drawings, is substantially the same as the rectangular hanger frame 8 as previously described, with the exception that the hanger rod thereof which is indicated by the reference character 27 is provided with offsets forming notches 28 in which the hooks 29 of the clothes hangers 30 hung thereon, rest, so that the hangers 30 are held in predetermined spaced relation with respect to each other and against movement longitudinally of the hanger rod 27 to insure against the garments hung on the device becoming mussed or wrinkled by the sliding of the garments to one end or the other of said main rectangular hanger frame.

As shown by Figure 8 of the drawings, the bar 31 of the main frame, is formed with stops 32 arranged in spaced relation with respect to each other, and between which the looped ends 33 of the hanger arm is disposed, so that the hanger arm will be held against movement longitudinally of the member 31.

From th foregoing it will be seen that due to the construction shown and described, I have provided a hanger of the portable type which may be readily and easily unfolded and positioned within a window of a motor vehicle, in such a way that the hanger will swing inwardly and support garments out of the way of the passengers within the car, and the garments will be held against being mussed by contact with each other when folded and placed on a seat of the car.

Having thus described the invention, what is claimed is:

1. In a garment hanger for positioning in a motor vehicle window opening, comprising a rectangular hanger frame, a clip pivotally connecting to said hanger frame, adapted to be positioned between a window sill and a window operating therethrough, said garment hanger including an upper horizontal bar on which garment hangers are hung, a hanger arm pivotally connected with said main frame, and a double-ended hook having one end hooked over said hanger arm holding said hanger arm in its active position, the other end of said hook being hooked into the window frame.

2. In a garment hanger for positioning in a motor vehicle window opening having a frame, a rectangular hanger frame, a clip pivotally connected to said hanger frame for positioning between the frame of the window opening and the window movable therein, rollers mounted on said hanger frame and adapted to rest on the sill of the window frame in which the device is positioned, a hanger arm pivotally connected with said hanger frame and a hook connected with said hanger arm for hooking into the frame of the window opening, securing the hanger arm in position.

References Cited in the file of this patent

UNITED STATES PATENTS

| | | |
|---|---|---|
| 2,454,368 | Auskelis | Nov. 23, 1948 |
| 2,456,303 | Mogan | Dec. 14, 1948 |
| 2,516,617 | Coughlin | July 25, 1950 |
| 2,550,172 | Swalwell | Apr. 24, 1951 |
| 2,647,669 | White | Aug. 4, 1953 |